United States Patent [19]

Aizawa

[11] Patent Number: 5,036,276
[45] Date of Patent: Jul. 30, 1991

[54] MAGNETIC ENCODER WITH HIGH RESOLUTION OF DATA SIGNAL RECORDING AT REDUCED RECORDING PITCH

[75] Inventor: Hitomi Aizawa, Suwa, Japan

[73] Assignee: Seiko Epson Corporation, Japan

[21] Appl. No.: 504,590

[22] Filed: Apr. 4, 1990

[30] Foreign Application Priority Data

Apr. 5, 1989 [JP] Japan ................................. 1-85902

[51] Int. Cl.$^5$ .......................... G01B 7/14; G01B 7/00; G06K 7/08; G11B 5/39
[52] U.S. Cl. .............................. 324/207.21; 235/449; 324/207.22; 324/207.23; 338/32 R; 360/113
[58] Field of Search ................... 324/173, 174, 207.21, 324/207.24, 207.25, 252; 338/32 R; 235/449; 360/113

[56] References Cited

U.S. PATENT DOCUMENTS

| 4,594,548 | 6/1986 | Takahashi et al. | 324/208 |
|---|---|---|---|
| 4,818,939 | 4/1989 | Takahashi et al. | 324/208 |

FOREIGN PATENT DOCUMENTS

| 0082112 | 4/1986 | Japan | 324/207.21 |
|---|---|---|---|
| 0069102 | 3/1987 | Japan | 324/207.21 |

*Primary Examiner*—Gerard R. Strecker
*Attorney, Agent, or Firm*—W. Douglas Carothers, Jr.

[57] ABSTRACT

A magnetic encoder comprises a sensor having a plurality of magnetoresistive (MR) elements placed in juxtaposed position relative to a magnetic recording medium upon which data signals are recorded employing a recording pitch, A. Output signals produced by the MR elements connected in a plurality of bridge circuits are formed by relative movement between the MR elements and the magnetic recording medium. The MR elements are positioned at A/n intervals, wherein n is an integer and n≧8. A multiplier circuit is connected to receive the output signals from the MR element bridge circuits and provide a plurality of phase shifted output signals corresponding to a A/N pitch interval of recording pitch, A, wherein N is an integer and N≧2.

5 Claims, 5 Drawing Sheets

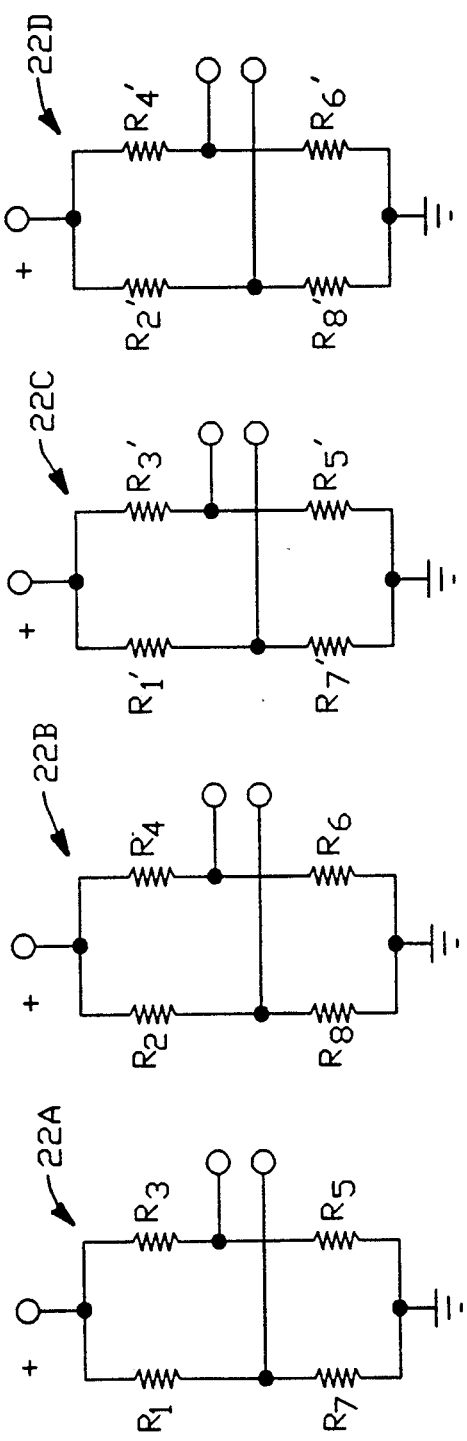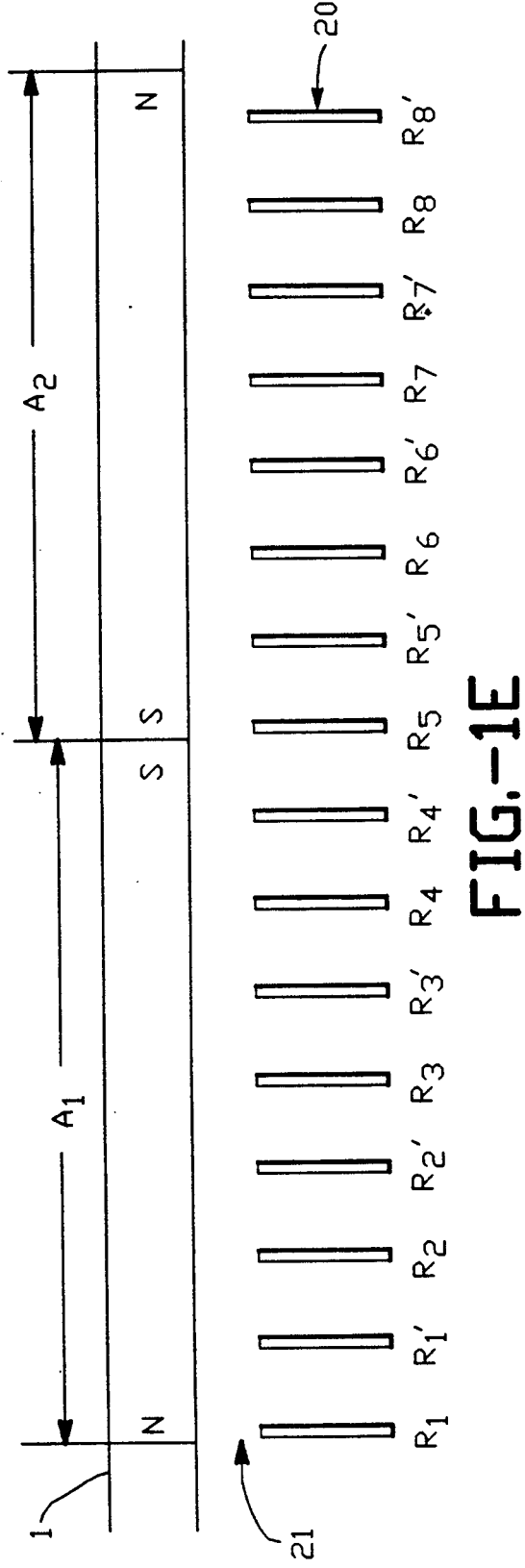
FIG.-1A  FIG.-1B  FIG.-1C  FIG.-1D  FIG.-1E

MAGNETIC ENCODER WITH HIGH RESOLUTION OF DATA SIGNAL RECORDING AT REDUCED RECORDING PITCH

BACKGROUND OF THE INVENTION

This invention relates generally to magnetic encoders and more particularly to means for producing stable and accurate multiple phase shifted signals in such encoders by placing magnetoresistive (MR) elements in the encoders at A/n intervals, wherein $n \geq 8$, of the recording pitch, A, of a magnetic recording medium, such as a drum, tape, disk or the like.

Shown in FIGS. 2A through 2C is a magnetic encoder of the prior art and is also disclosed in U.S. Pat. No. 4,594,548. In this encoder, magnetoresistive (MR) elements, $R_x$, form sensor 2 and are placed at A/4 pitch intervals, relative to signal recording wavelength or recording pitch, A, of magnetic recording medium 1. The encoder circuit 10 for sensor 2 is disclosed in FIGS. 2A and 2B and comprises a pair of bridge circuits 10A and 10B wherein MR elements $R_1$, $R_3$, $R_5$ and $R_7$ are connected to form bridge circuit 10A and MR elements $R_2$, $R_4$, $R_6$ and $R_8$ are connected to form bridge circuit 10B. The outputs of bridge circuits 10 are connected as inputs to multiplier circuit 14, shown in FIG. 3, to amplify the sensor analog signals via amplifying stages 11 to form amplified phase shifted analog signals, I and J, shown in FIG. 4, which are then converted into phase shifted, pulse output signals, G and H, shown in FIG. 4, via operational amplifiers or comparators 3 and pull down transistors 12 of circuit 14.

When high resolution output signals are required relative to magnetic recording medium 1, recording pitch, A, of recording medium 1 is reduced for recording magnetic signals. In such a case, it is the practice to apply different comparative reference voltages by varying the input reference voltages at 13 to comparators 3 and the desired phase shifted signals of sensors 2 are derived via the outputs of comparators 3 and pull down transistors 12. However, as recognized in U.S. Pat. No. 4,594,548, when recording pitch, A, of recording medium 1 is reduced or made shorter to improve recording resolution, the magnetic field strength to MR sensor 2 is reduced. Unless gap 15 between recording medium 1 and MR sensor 2 is also correspondingly decreased, the output signals from the MR sensor 2 and its bridge circuits 10 would be too small and weak for amplification and processing via multiplier circuit 14.

Furthermore, if gap 15 is constructed or adjusted to be too small to accommodate changes toward providing for higher resolution, assembly and adjustment of the encoder is made difficult.

Also, in the case where changes are made to applied input reference voltages to comparators 3 in order to phase shift the output signals of MR sensor 2, the output signals of MR sensor 2 are easily affected by changes in environmental and ambient conditions since these signals from their initial creation, by their very nature, are weak. Furthermore, each comparative reference voltage set at reference voltage 13 has to be accurately adjusted and correct adjustment is not easily maintained on a continuous basis. Also, the duty ratio of output signals, G and H, fluctuate according to changes in circuit and ambient conditions, such as circuit voltages and temperatures and humidity. In the worst case, multiple phase shifted signals, G and H, are not accurately produced due to such changing conditions.

It is an object of this invention is to provide a high resolution magnetic encoder capable of providing stable and accurate multiple phase shifted signals in spite of large changes in recording pitch, A, of a magnetic recording medium, particularly changes in reduction of recording pitch, A, to obtain high resolution recording of data signals on the magnetic recording medium.

It is another object of this invention to improve the accuracy of detection of a magnetic encoder while reducing the recording pitch, A, without the need to make any changes to the sensor/medium gap by increasing the number of MR elements, corresponding MR element bridge circuits and the resultant plurality of derived phase shifted outputs to produce a set or pair of desired output phase shift signals.

SUMMARY OF THE INVENTION

According to this invention, a magnetic encoder comprises a sensor having a plurality of magnetoresistive (MR) elements placed in juxtaposed position relative to a magnetic recording medium upon which data signals are recorded employing a recording pitch, A. Output signals produced by the MR elements connected in a plurality of bridge circuits are formed by relative movement between the MR elements and the magnetic recording medium. The MR elements are positioned at A/n intervals, wherein n is an integer and $n \geq 8$. A multiplier circuit is connected to receive the output signals from the MR element bridge circuits and provide a plurality of phase shifted output signals corresponding to a A/N pitch interval of recording pitch, A, wherein N is an integer and $N \geq 2$.

When relative movement is provided between the magnetic recording medium and the MR sensor, signals are produced at the MR elements which are shifted by a A/n phase relative to recording pitch, A. By utilizing the output signal derived from each MR element bridge circuit, a signal which is the same as a signal which can be obtained when magnetic pitch A is recorded at a pitch A/N is formed in an expanded multiplier circuit.

In a preferred embodiment, sixteen MR sensors are uniformly positioned within two recording pitches, A, and are distributed relative to each other as well as bridged with respect to each other to increase the output level from the respective bridges and obtain an improved frequency response characteristic over sensor arrangements of the prior art.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 1A to 1E are circuit layouts relative to a MR sensor and recording medium in accordance with this invention.

DESCRIPTION OF THE PREFERRED EMBODIMENTS

Figure 2A:
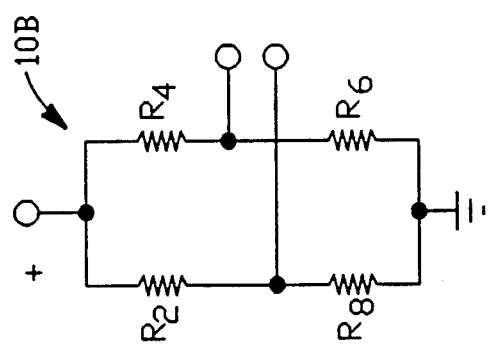
FIGS. 2A to 2C are circuit layouts relative to MR sensor and recording medium in accordance with the prior art.
Figure 2B:
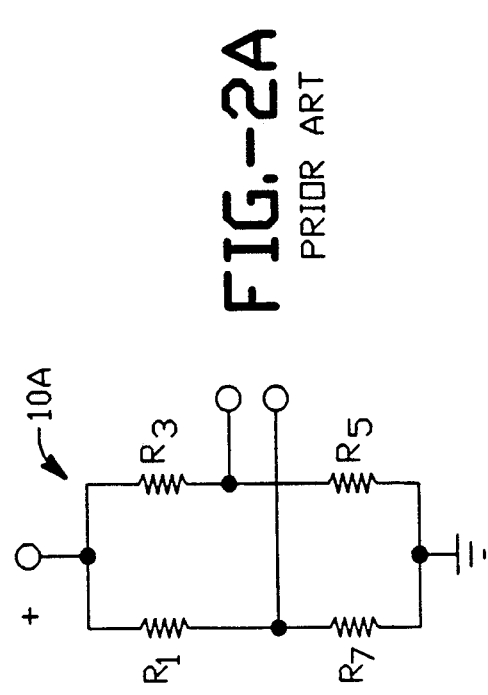
Figure 2C:
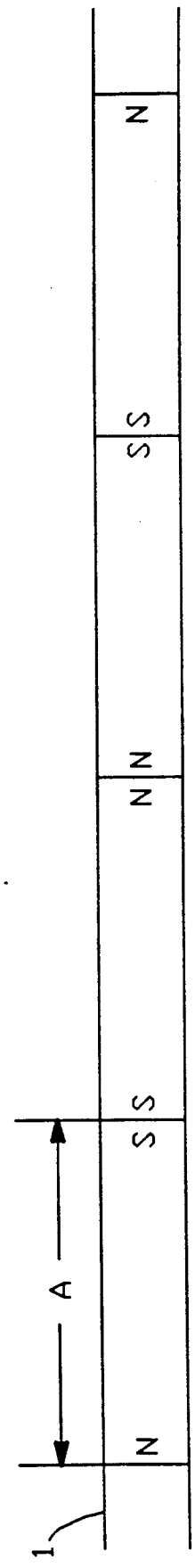
Figure 2C:
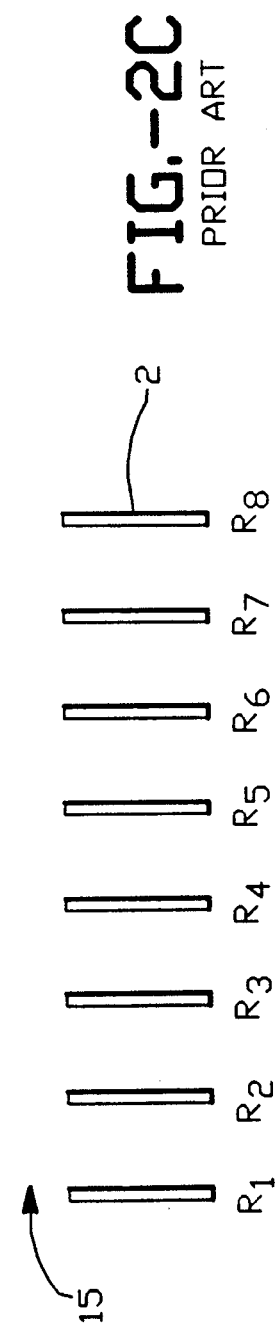
Figure 3:
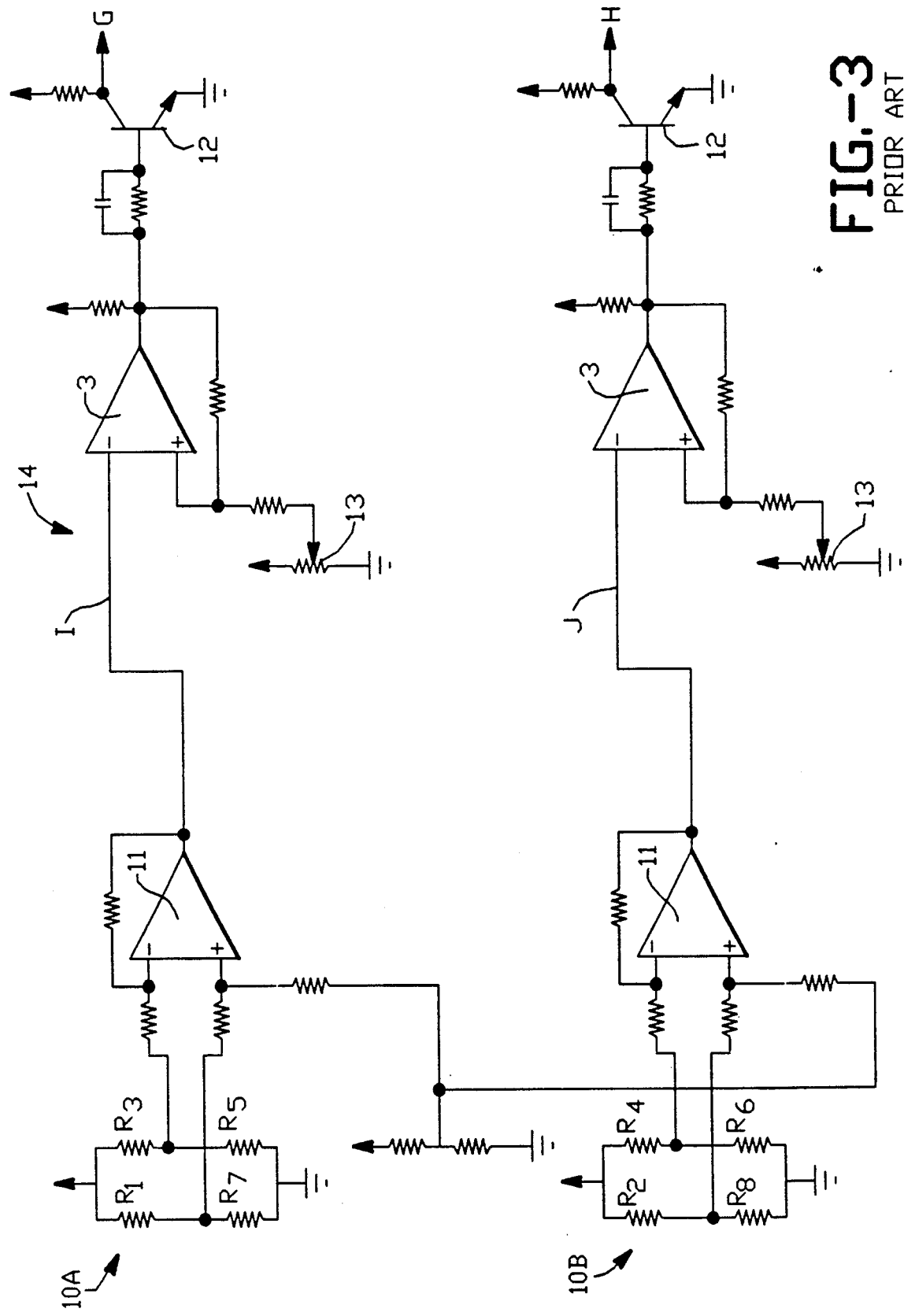
FIG. 3 is a circuit diagram of a magnetic encoder multiplier circuit of the prior art.
Figure 4:
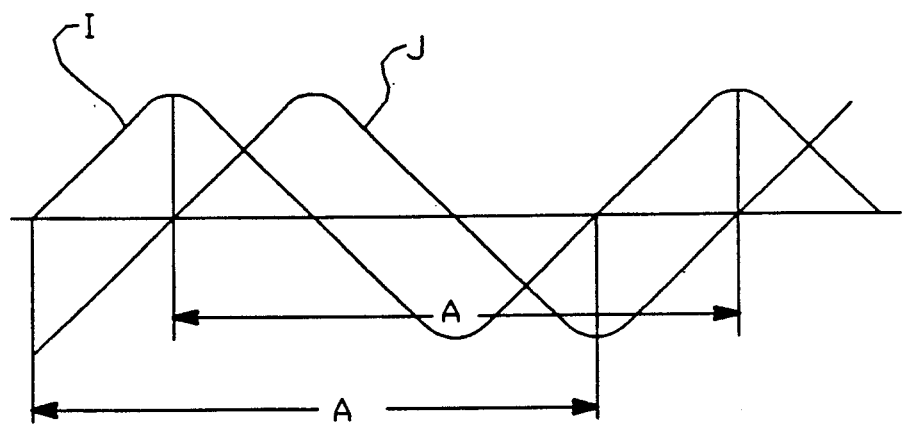
FIG. 4 is a waveform diagram illustrating the phase shift waveforms for the magnetic encoder of the prior art.
Figure 4:
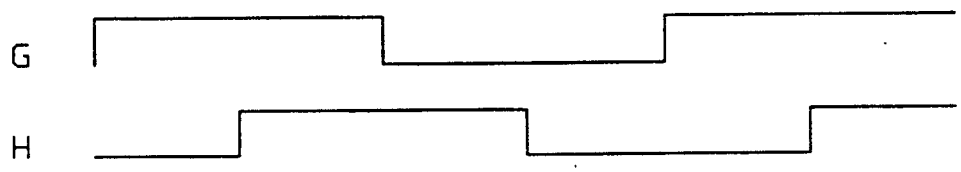
Figure 6:
FIG. 6 is a waveform diagram illustrating the phase shift waveforms for the magnetic encoder of this invention.
Figure 6:
Figure 6:
Figure 6:
Figure 6:
Figure 6:
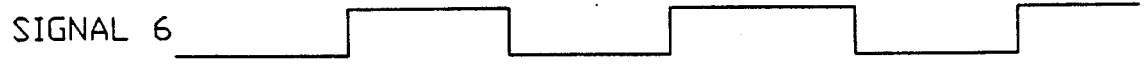
Figure 5:
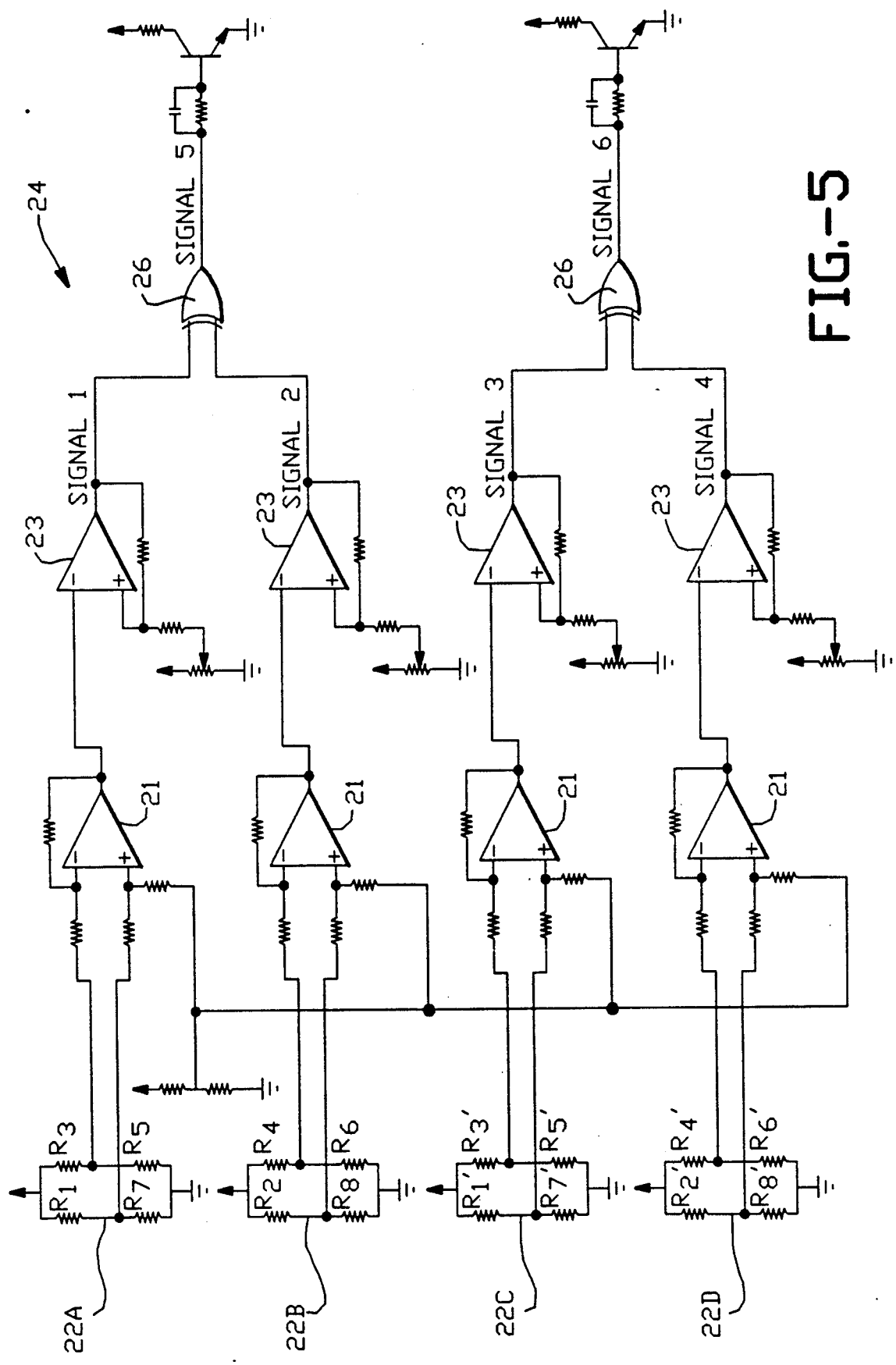
FIG. 5 is a circuit diagram of the magnetic encoder multiplier circuit of the present invention.

Reference is now made to FIGS. 1A through 1E disclosing the MR sensor 20 of this invention. In MR sensor 20, MR elements, $R_x$ and $R'_x$, are placed at a A/8 pitch relative to recording pitch, A, of magnetic recording medium 1. Sensors 20 are formed into a plurality of bridge circuits 22 and the output of each circuit 22A, 22B, 22C and 22D provides a respective input into multiplier circuit 24, as shown in FIG. 5. Thus, MR elements $R_1$, $R_3$ of bridge circuit 22A; MR elements $R_2$, $R_4$ of bridge circuit 22B; MR elements $R'_1$, $R'_3$ of bridge circuit 22C and $R'_2$, $R'_4$ of bridge circuit 22D are positioned in the span of first pitch interval $A_1$. MR elements $R_5$, $R_7$ of bridge circuit 22A; MR elements $R_6$, $R_8$ of bridge circuit 22B: MR elements $R'_5$, $R'_7$ of bridge circuit 22C and $R'_6$, $R'_8$ of bridge circuit 22D are positioned in the span of second pitch interval, $A_2$. The four bridge circuit outputs of MR sensor 2 are amplified by the four differential amplifiers 21 and formed into pulse waveforms by the four comparators 23. As a result, signals 1, 2, 3 and 4, as shown in FIG. 6, are formed at the outputs of comparators 23. These signals are then supplied to XOR gates 26 resulting in phase shifted signals 5 and 6, as shown in FIG. 5.

As it is clear from the waveform diagram in FIG. 6, signals 5 and 6 are of a ½ duty cycle compared to signal 1 wherein one cycle of signal 1 corresponds to recording pitch, A, of recording medium 1. In other words, output signals 5 and 6 are one-half of recording pitch, A. Thus, by changing the positions of MR sensors relative to pitch, A, multiple phase shifted, signals of smaller duty cycle relative to the set recording pitch can be accurately derived. Furthermore, since phase shifted output signals 5 and 6 of high resolution can be produced even when recording pitch, A, is large, gap 21 between recording medium 1 and MR sensor 20 can remain large or unchanged. Thus, gap 21 can be determined relative to recording pitch, A and accurately adjusted and easily set at the time of assembly of the magnetic encoder.

It is recognized that, in view of the state of the art of magnetic recording technology, it is difficult to entertain a reduction in magnetic recording pitch, A, when considering a high resolution encoder because the upper limits for such an adjustment have already been fairly realized. However, by employing thin film semiconductor technology for fabrication of MR sensor 20, a smaller magnetic pitch, A, can be achieved.

Thus, the difference in the magnetic encoder structure of this invention compared to the prior art encoder structure is that, in the this invention, MR sensor 20 is positioned relative to recording medium 1 at A/n pitch or interval where n is equal to or greater than 8. In particular, there are at least sixteen MR sensors uniformly positioned within two recording pitches, $A_1$ and $A_2$ in FIG. 1E, and are distributed relative to each other as well as bridged with respect to each other to increase the output level from the respective combination bridges with a resultant improvement in the frequency response characteristic over sensor arrangements of the prior art. Therefore, the stability and accuracy of the magnetic encoder of this invention is improved over the magnetic encoder of the prior art. Also, in the prior art encoder method for phase shifting the output signals of the MR sensor via a multiplier circuit 24, the output signals are produced relative to predetermined voltage levels applied to comparators 23, the output signals of the circuit 24 are very stable relative to the changes in circuit and ambient conditions.

Furthermore, even though the placement pitch of the MR elements of sensor 20 is reduced compared to MR sensors 2 of the prior art, since signal multiplication is performed only at the time of digitizing the MR output signals and, further, since the MR elements are placed at A/n relative to recording pitch A, the relative phase shift between respective output signals 5 and 6 does not vary or change during relative movement between sensor 20 and recording medium 1 thereby providing for very stable, high resolution, phase shifted output signals.

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope of the appended claims.

What is claimed is:

1. A magnetic encoder comprising a sensor having a plurality of MR elements placed in juxtaposed position relative to a magnetic recording medium upon which data signals are recorded at a recording pitch, A, and wherein output signals are derived from said MR elements from the relative movement between said sensor and said recording medium, the improvement in said encoder comprising:

2n MR elements positioned at A/n intervals over two recording pitches, $A_1$ and $A_2$, relative to said recording medium recording pitch, A, wherein n is an integer and $n \geq 8$, said MR elements coupled into n/2 bridge circuits to produce n/2 multiphase output signals, and a multiplier circuit is connected to receive said multiphase output signals to produce resultant phase shifted output signals derived from said multiphase output signals corresponding to a duty cycle of A/N wherein N is an integer and $N \geq 2$.

2. The magnetic encoder of claim 1 wherein there are sixteen MR elements distributed uniformly relative to two recording pitches, $A_1$ and $A_2$, said MR elements formed as groups of four into four bridge circuits relative to said two recording pitches to provide for an increase in output level and improved frequency response characteristic of said encoder.

3. A magnetic encoder circuit comprising a sensor having at least sixteen MR elements placed in juxtaposed position relative to a magnetic recording medium upon which data signals are recorded at a recording pitch, A, and wherein output signals are derived from said MR elements from the relative movement between said sensor and said recording medium, said MR elements positioned at A/8 intervals over two recording pitches, $A_1$ and $A_2$, relative to said recording medium recording pitch, A, said MR elements formed into four groups of MR elements connected into four bridge circuits to provide four MR output signals, said MR elements as grouped in each of said bridge circuits positioned at A/2 intervals relative to said two recording pitches, $A_1$ and $A_2$, a plurality of differential amplifiers each connected to receive one of said MR output signals from one of said bridge circuits and amplify said one MR output signal, a plurality of comparator circuits connected to respectively receive an amplified output signal from one of said differential amplifiers and produce a plurality of pulse signals based upon said MR amplified output signals, and XOR gates connected to respectively receive combinations of said pulse signals from respective of said comparator circuits to produce multiple phase shifted output signals having a reduced duty cycle compared to said MR output signals.

4. A magnetic encoder having a sensor placed in juxtaposed position relative to a magnetic recording medium upon which data signals are recorded at a recording pitch, A, wherein high resolution of data signal recording is obtained without a reduction in the sensor/medium gap formed between said sensor and said recording medium and comprising:

2n MR elements uniformly positioned over the span of two recording pitches, 2A, wherein n MR elements are provided per pitch, A, n is an integer with $n \geq 8$, said MR elements coupled into n/2 bridge circuits comprising groups of four MR elements per bridge circuit for producing n/2 respective multiphase output signals, said MR elements in each of said bridge circuit groups respectively placed at every n/2 position over the span of said two recording pitches, 2A, and a multiplier circuit connected to receive said multiphase output signals to produce resultant phase shifted output signals derived from said multiphase output signals corresponding to a duty cycle of A/N wherein N is an integer and $N \geq 2$.

5. A magnetic encoder having a sensor placed in juxtaposed position relative to a magnetic recording medium upon which data signals are recorded at a recording pitch, A, wherein high resolution of data signal recording is obtained without a reduction in the sensor/medium gap formed between said sensor and said recording medium and comprising:

at least sixteen MR elements uniformly positioned over the span of two recording pitches, 2A, wherein eight MR elements are provided per pitch, A, said MR elements coupled into four bridge circuits comprising groups of four MR elements per bridge circuit for producing four respective multiphase output signals, said MR elements in each of said bridge circuit groups respectively placed at every fourth position over the span of said two recording pitches, 2A, and a multiplier circuit connected to receive said multiphase output signals to produce resultant phase shifted output signals derived from said multiphase output signals corresponding to a duty cycle of one-half of said recording pitch, A.

* * * * *